United States Patent [19]

Fennel, Jr.

[11] 3,728,692

[45] Apr. 17, 1973

[54] INSTRUCTION SELECTION IN A TWO-PROGRAM COUNTER INSTRUCTION UNIT

[75] Inventor: John Wenard Fennel, Jr., Beltsville, Md.

[73] Assignee: International Business Machines Corporation, Armonk, N.Y.

[22] Filed: Aug. 31, 1971

[21] Appl. No.: 176,494

[52] U.S. Cl. ....340/172.5
[51] Int. Cl. ....G06f 9/18
[58] Field of Search ....340/172.5

[56] References Cited

UNITED STATES PATENTS

| | | | |
|---|---|---|---|
| 3,373,408 | 3/1968 | Ling | 340/172.5 |
| 3,548,384 | 12/1970 | Barton et al. | 340/172.5 |
| 3,573,851 | 4/1971 | Watson et al. | 340/172.5 |
| 3,585,600 | 6/1971 | Saltini | 340/172.5 |
| 3,601,812 | 8/1971 | Weisbecker | 340/172.5 |

*Primary Examiner*—Paul J. Henon
*Assistant Examiner*—Paul R. Woods
*Attorney*—J. Jancin, Jr. et al.

[57] ABSTRACT

In an instruction handling unit specifically designed for pipeline processing of instructions an apparatus is disclosed which allows the instruction handling unit to process simultaneously computer instructions from two different programs. The apparatus employed for sharing the instruction unit processing capabilities among two programs performs certain checks upon the specific instructions of the two different instruction streams and determines from various machine conditions and variable program conditions which instruction will be executed within the instruction handling unit. The selection algorithm involved is designed to make maximum utilization of the instruction handling unit while preventing any one instruction stream from monopolizing the instruction handling capabilities of the instruction unit.

5 Claims, 6 Drawing Figures

INVENTOR

JOHN W. FENNEL, JR.

BY J. Jancin Jr.

ATTORNEY

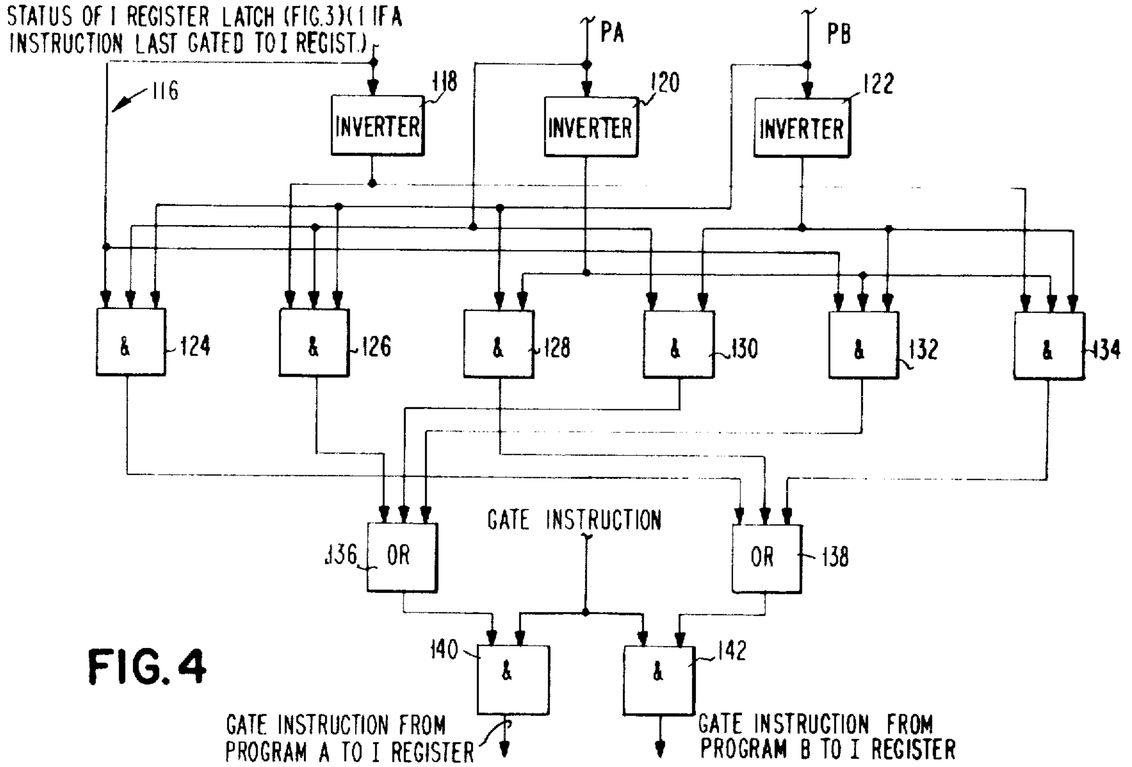
FIG. 4
FIG. 5
| INSTR. IN I REG | MACHINE STATUS PA | MACHINE STATUS PB | SELECT NEXT CYCLE |
|---|---|---|---|
| A | 1 | 1 | B |
| B | 1 | 1 | A |
| X | 0 | 1 | B |
| X | 1 | 0 | A |
| A | 0 | 0 | A |
| B | 0 | 0 | B |
(X MEANS DON'T CARE)
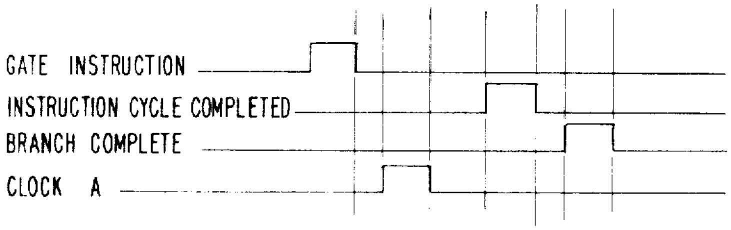
FIG. 6

INSTRUCTION SELECTION IN A TWO-PROGRAM COUNTER INSTRUCTION UNIT

RELATED APPLICATION

This patent application is related to the application Ser. No. 176,495 entitled "Apparatus and Method for Serializing Instructions from Two Independent Instruction Streams" by J. O. Celtruda, et al. and assigned to the same assignee as the present application.

BACKGROUND OF THE INVENTION

This invention relates generally to the field of digital computers and more specifically to the field of high performance digital computation.

In the field of high performance digital computation, many techniques have been developed in order to improve the speed at which a computer can perform instructions. One approach to improving computer performance has been to optimize the system architecture in order to achieve this objective. The computer system shown in U.S. Pat. No. 3,400,371 is an example of this particular approach to performance improvement.

Another improvement made in many advanced computing systems is to have architecture in which the storage function is divided amongst a relatively slow speed high capacity storage and a very high speed low capacity storage. The computer would normally operate upon instructions contained within the high speed low capacity storage thus increasing the instruction processing capability because instructions can be fetched from memory faster than from systems of the type described in the above mentioned patent.

Other systems have advanced beyond the systems having the two basic memory areas and have developed processors known as pipelined processors. These processors typically perform instructions which are contained in high speed low capacity storages in such a manner than more than one instruction is actually being processed at any one given time. In such a machine, one instruction might be completed within a given machine cycle at the same time as another instruction had only been partially completed. Thus, the latter approach represents a mode of operation in which the efficiency of the computer system can be greatly enhanced because more than one instruction in a given instruction stream can be processed simultaneously within the computer system.

Although the pipelined processor is a highly efficient one as compared to other data processors, the pipeline processor does have an inherent problem which makes the maximum utilization of the pipeline processor difficult to achieve. It has been found, for example, that a pipelined processor operating upon a single instruction stream does not fully utilize the instruction processing capability in situations where the high speed buffer has to be updated from the main storage. During these periods of time, the processor remains idle waiting for the information to be stored within the high speed buffer. Additionally, there are other bottle necks within a single instruction stream which will force the pipeline processor to become less efficient. For example, certain branching and program dependencies will cause a discontinuity in the instruction stream and a target instruction may have to be fetched. In such situations the pipeline processor is unable to be operated at a full capacity.

In light of the above identified problem within a pipeline data processor, it is a primary object of this invention to produce a pipeline processor which is more efficient than pipeline processors heretofore known.

It is a further object of this invention to increase the efficiency of pipeline processors without substantially increasing the hardware cost of such a pipeline processor.

It is a further object of this invention to produce a pipeline processor which is capable of operating upon two instruction streams simultaneously and achieve this simultaneous operation at no significant increase in cost.

SUMMARY OF THE INVENTION

The above identified objects and features of the present invention are achieved through unique selection circuitry operated in accordance with a novel algorithm for selecting instructions amongst two totally independent instruction streams. The selection process requires certain analysis to be performed upon the instructions in each of the independent instruction streams. This analysis is performed in order to determine whether one or the other instruction streams would have to wait before being executed within the pipeline processor because of a certain program dependency or because a previous instruction in the same stream had executed a fetch of data from the main storage to the buffer storage which had not yet been completed. Where one of the instruction streams could not be executed in the next cycle within the pipeline instruction unit, the other instruction stream will have its instruction gated into the pipeline circuitry for subsequent processing. In situations where both instruction streams are "hung up", no instruction is gated into the pipeline circuitry of the instruction unit and further gating of instructions is delayed until the resources are available for one of the two instruction streams. In many instances the two instruction streams will be free to program dependencies and an instruction from either instruction stream could be gated into the pipelined processor. Under these circumstances, the selection algorithm requires that the instructions from the two independent streams be altered.

The foregoing and other objects, features and advantages of the invention will be apparent from the following more particular description of preferred embodiments of the invention, as illustrated in the accompanying drawings.

In the drawings:

FIG. 4 shows additional logic not shown in FIG. 3 which encompasses a portion of the detailed description of the present invention.

FIG. 5 shows a table which depicts the condition under which the instructions from a given instruction stream will be gated to the I register during a succeeding cycle.

FIG. 6 shows the clock timing for various gated signals used within the circuitry of FIG. 3.

DETAILED DESCRIPTION

Figure 1:
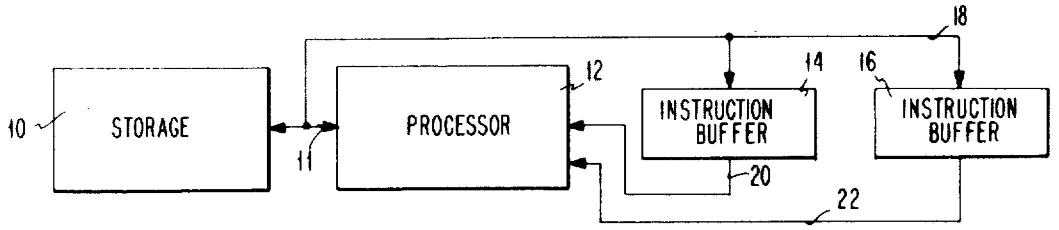
FIG. 1 shows a schematic drawing of the present invention.

This invention relates to an approach to sharing a pipelined processor amongst instructions from two different instruction streams with the objective of obtaining data processing speeds which approximate twice the rate which could be obtained with a single pipelined processor performing instructions in a single instruction stream. In FIG. 1, the overall structure of the present invention is shown. Storage element 10 is shown interconnected with processor 12. Storage element 10 could be any type of storage element typically found within the present day computer systems such as a core storage unit or an integrated circuit storage unit. Processor 12 is a pipelined processor which will not be discussed in this application as pipelined processors have been discussed amply in the prior art. For example, one type of pipeline system was discussed in the article entitled "Circuit Implementation of High-Speed Pipeline Systems" by L. W. Cotten which was published in the proceedings of the Fall Joint Computer Conference, 1965 at page 489. Another article relating to pipelined systems is contained in the article entitled "The IBM System/360 Model 91: Floating-Point Execution Unit" which was published in January 1967 in the IBM Journal of Research and Development, Vol. 11, No. 1 at page 34.

Referring again to FIG. 1, the processor 12 is connected to two instruction buffers 14 and 16 via data bus 18. Processor 12 contains certain addressing hardware which is capable of fetching instructions from storage 10 over data bus 18 for two different instruction streams and operands for the processor 12 over data bus 11. Processor 12 fetches instructions for the two different instruction streams from storage. The instructions pass to instruction buffers 14 and 16 via data bus 18. Processor 12 gates the instructions on data bus 18 in such a way that instruction buffer 14 will only contain instructions from one instruction stream while instruction buffer 16 contains only instructions from a second instruction stream. Each of the instruction buffers apply its instructions to other hardware within processor 12 on independent busses. For example, instruction buffer 14 is connected to processor 12 via data bus 20 while instruction buffer 16 is connected to processor 12 via a different data bus 22. Internal to processor 12 is selection hardware which will cause the processor to begin processing the instruction contained within either instruction buffer 14 or instruction buffer 16 during the next processing cycle. It is this selection circuitry internal to the processor which is at the core of the present invention.

Figure 2:
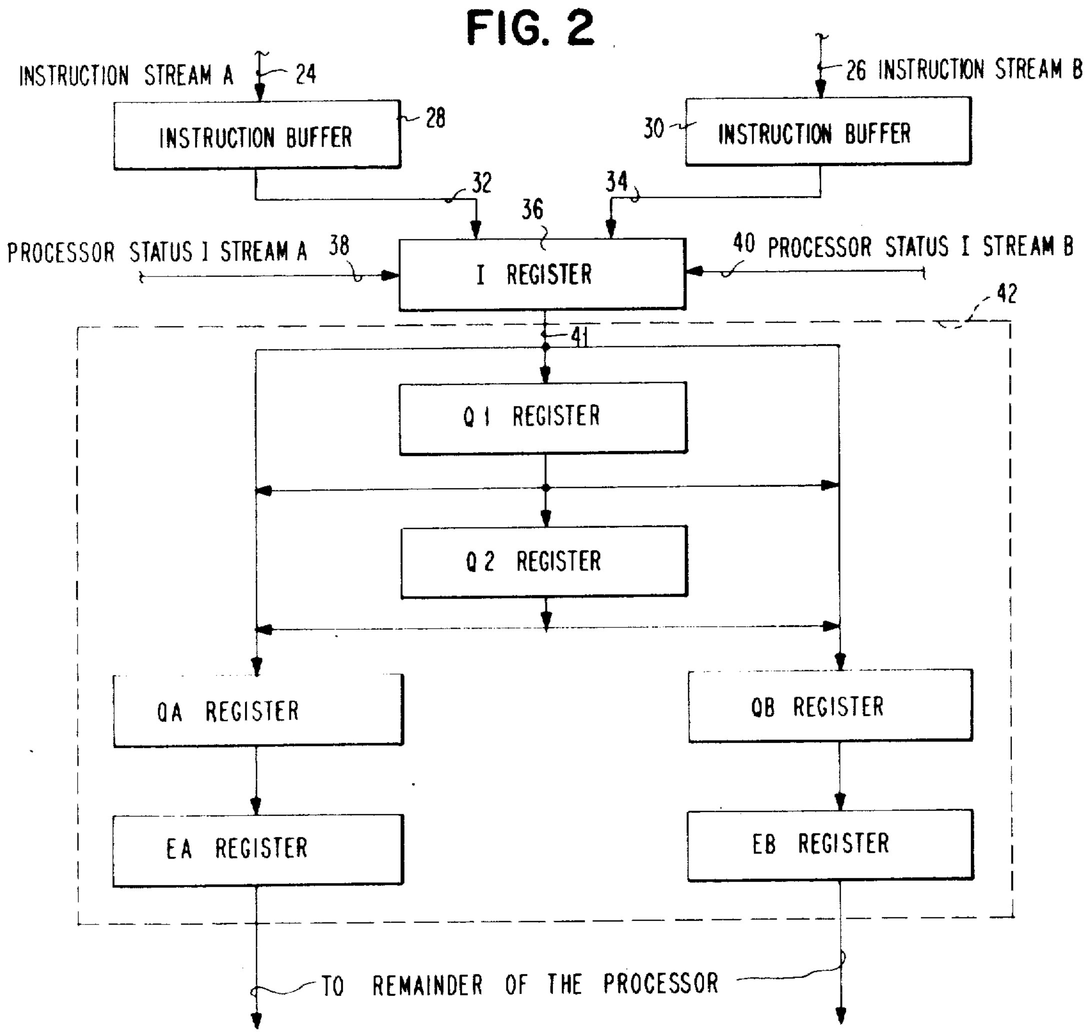
FIG. 2 shows the details of the present invention in block diagram form.

Referring now to FIG. 2, a more detailed block diagram of the instruction staging hardware is shown. Instruction stream A is shown entering along data bus 24 while instruction stream B enters along data bus 26. It is not necessary that the instruction streams enter the I-Register-36 shown in FIG. 2 on two separate data busses because a single data bus could be shared amongst the two instruction streams. The data has been shown entering on two independent instruction streams to further emphasize the fact that the instructions being executed by the processor are truly from two independent streams of instructions. It should be further noted that the source of these independent streams of instructions is not really a function of the present invention although a separate memory could be attached to each of the input data busses 24 and 26. Each of these memories would be addressable from conventional instruction addressing hardware as found in typical present day computer systems and would be designed for accessing instructions within the independent instruction streams. Once the instructions were made available upon the independent or shared, as the case may be, data busses, the instructions would be gated into instruction buffer 28 or instruction buffer 30.

Instruction buffer 28 is merely a temporary storage for instructions in an instruction stream which will be called instruction stream A. This is an artifical designation and has been made merely to clarify the differences between the the different instruction streams. The instructions that reside within instruction buffer 30 are from instruction stream B. Instruction buffer 28 would correspond to instruction buffer 14 in FIG. 1 while instruction buffer 30 would correspond to instruction buffer 16 (of FIG. 1). Each instruction buffer 28 and 30 is simply a standard electronic buffer or register in which the data from the memories is stored.

Instruction buffer 28 is connected to the staging area of instructions within the pipeline processor by data bus 32. Instruction buffer 30 is connected to the instruction staging area within the pipeline processor via data bus 34. Data busses 32 and 34 go directly to I Register 36. I Register 36 receives processor status information for instruction stream A along data bus 38 as well as processor status information for instruction stream B on data bus 40. The following are examples of processor status information required for each stream: X field valid, zero, or not needed; B field valid, zero, or not needed; address register available for single fetch or not needed; address register available for Store or E-Unit Instruction or I-Unit fetch or not needed; one word operand buffer available or not needed; two word operand buffer available or not needed; General Purpose Register read priority available or not needed; one Queue Register available for that no branch in progress if branch instruction; complete instruction in I-Register; no defeat condition for the program.

Instruction register 36 in actuality is more than a register for it performs certain functions and would be better described as a function register. The functions of I Register 36 encompass the temporary storage of instructions from the instruction buffers and also the function of determining which instruction from the instruction buffers is to be temporarily stored within the temporary storage area of I Register 36 as two instructions are always being applied to the I Register via data busses 32 and 34.

Connected to the output of I Register 36 is a portion of hardware contained within dotted line 42. This hardware is identical to that hardware shown in FIG. 2 of the copending application entitled "Apparatus and Method For Serializing Instructions From Two Independent Instruction Streams" by J. Celtruda, et al. the latter application being assigned to the same assignee as the present application and is incorporated by reference herein.

Figure 3:
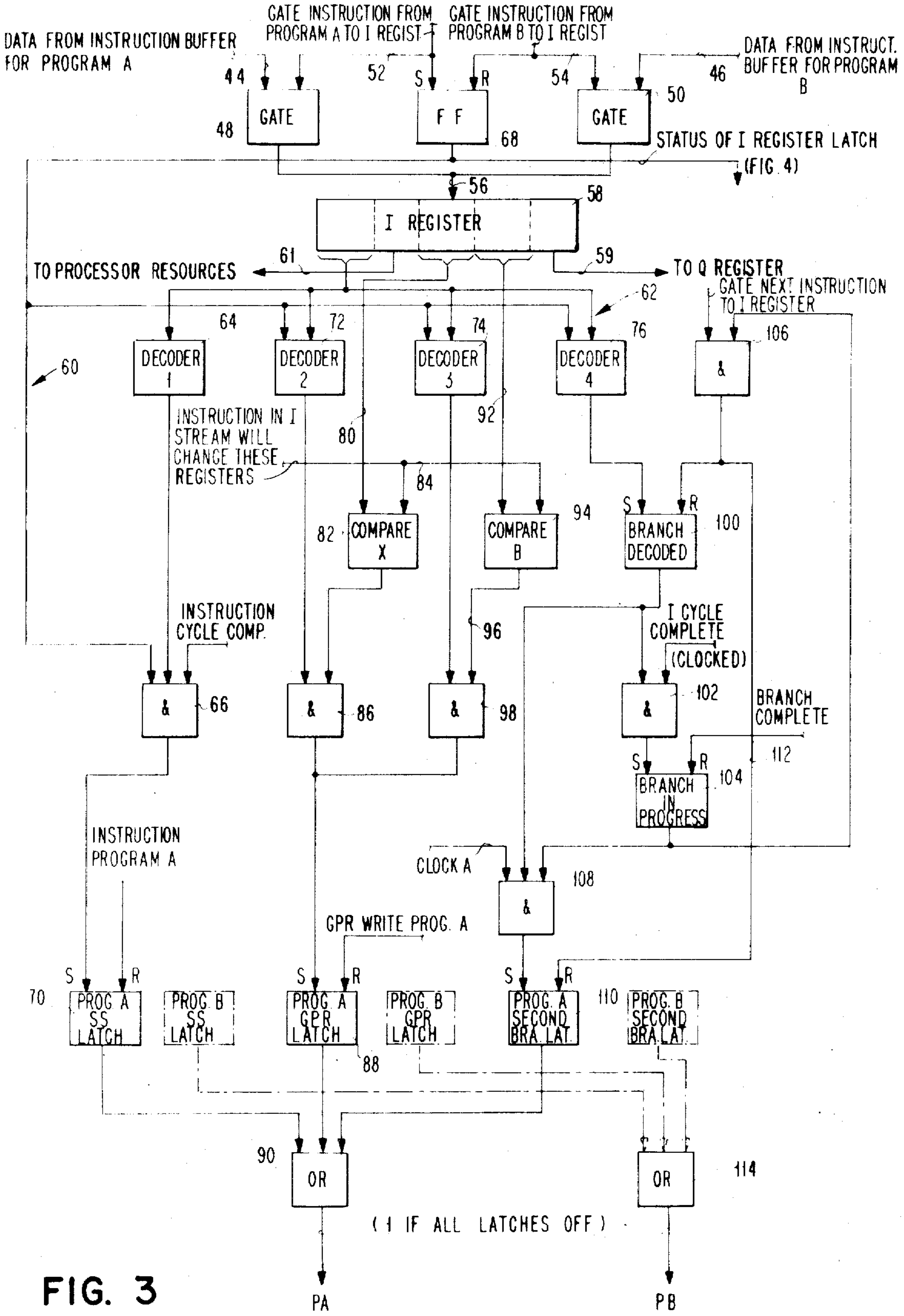
FIG. 3 shows a detailed embodiment for a portion of the present invention.

The circuitry of the I Register 36 of FIG. 2 is shown in greater detail in FIGS. 3–6. Referring now specifically to FIG. 3, the data from the instruction buffer for program A is presented to function hardware on input bus 44. Input bus 44 of FIG. 3 would correspond to the data bus 32 of FIG. 2. The input data from the instruction buffer for program B is transmitted along input data bus 46 which corresponds to data bus 34 of FIG. 2. Input bus 44 is one input to gate 48 while input bus 46 is one input to gate 50. Gate 48 and 50 in actuality comprise two input AND circuits, one circuit for each of the input lines of the corresponding input data busses. The second input of the AND circuit in Gate 48 is connected to line 52 which represents a signal called for the gating into the I Register of the data found within the instruction for program A. The second input to the AND circuits of gate 50 is connected to line 54 which represents a signal calling for the gating of the data from the instruction buffer for program B. The signals on lines 52 and 54, as will be shown, are mutually exclusive signals and, therefore, only one of the instructions contained within the two instruction buffers will be gated upon data bus 56 by gate 48 or 50. Data bus 56 forms an input to I Register 58 which is truly a register for the temporary storage of an instruction from either instruction stream A or instruction stream B. For simplicity, an output to I Register 58 has not been shown, however, I Register 58 of FIG. 3 would be connected to the circuitry within dotted line 42 of FIG. 2 along data bus 41 (FIG. 2.)

Assuming for the time being that an instruction from program A has been gated into I Register 58, the operation of the I Register will be described and the various interlocks with the remaining portion of a pipeline processor discussed. In addition, the algorithm for determining which instruction will be gated during the next gating cycle to the I Register 58 is also to be discussed in connection with an instruction from instruction stream A initially residing in I Register 58.

The overall function of the circuitry within FIG. 3 and 4 is to take an instruction from either data stream and begin the processing of that instruction. The beginning of processing involves various calculations and checks upon the resources within the pipeline processor. For example, there are certain types of instructions which cannot be processed in the pipeline while certain other instructions are already in progress. For example, if a branch instruction is being processed by the pipeline for one instruction stream, a second branch instruction in the same instruction stream cannot be executed until the first branch instruction has been resolved because the second branch instruction might actually be in the wrong path of the first branch instruction. That is, upon executing a branch instruction, a pipeline processor will normally guess as to the route which will be taken and will continue processing instructions for that instruction stream based upon the assumed branch result. If the branch proves to take a route other than the assumed route, the instructions processed based upon the guess are meaningless and their results should not be employed in the program. Another problem is that instructions already in the pipeline may be of the type which will change the general purpose registers which are to be used by succeeding instructions. Thus, a succeeding instruction cannot be allowed to proceed until such time as the preceding instructions have actually made the changes to the general purpose registers that are desired by the programmer. It is the purpose, therefore, of the circuitry of FIG. 3 to resolve these interlock problems and determine which instruction stream must be temporarily halted because of an interlock.

Referring now to FIG. 3, one output of I Register 58 is placed upon data bus 62 which corresponds to a portion of the contents of the I Register 58 which is dedicated to the operation code within the given instruction. For instructions which are in the format of those found within computers of IBM System/360, the first eight data bits of I Register 58 would be placed on data bus 62. Data bus 62 enters decoder 64. Decoder 64 is designed to have an output whenever the operation code of the instruction in I Register 58 is an SS instruction, an execute instruction or a store multiple instruction. The output of decoder 64 comprises one of the inputs of AND circuit 66.

A second input to AND circuit 66 is that signal upon line 60. Whenever line 60 has a binary value of one it means that flip-flop 68 has been set by a signal which gated an instruction from the instruction buffer for program A. The third input to AND circuit 66 is a clock known as instruction cycle complete. This clock and its relative time to other clocks is shown in FIG. 6. The output of AND circuit 66 will be a one during a clock period if decoder 64 has decoded the above mentioned instruction types and flip-flop 68 has been set. The consequence of AND circuit 66 having an output of one is that program A SS latch 70 will be set. The effect of setting this latch will be discussed later.

There are several other decoders shown in FIG. 3, namely decoders 72, 74 and 76. These decoders are shown as having an input from data bus 62 and also from line 60. Data bus 62 contains the operation code of the instruction contained within I Register 58 and each of the decoders are designed to decode certain types of instructions which might reside within I Register 58. The reason for the insertion of line 60 is that these decoders, decoder 72, 74 and 76 should only be activated when an instruction resides in I Register 58 which is an instruction from program A. Thus, line 60 acts as an activating or gating signal to allow decoders 72, 74 and 76 to become operational.

Decoder 72 is designed specifically to have an output whenever an instruction from instruction stream A is in I Register 58 and the operation code corresponds to an instruction which utilizes an X field. The X field is a particular field found within instructions of the type found within IBM System/360 machines. The X field normally contain an address of a general purpose register which is to be used by the instruction contained within I Register 58. Since the contents of this register must be correct, the pipelined processor must be scanned to determine whether an instruction already in process for program A is going to change the contents of the general purpose register whose address is in the X field of the instruction within I Register 58. In order to accomplish this comparison, the X field of the instruction in I Register 58 is placed upon data bus 80 which is inputted into comparison circuitry 82. The second input to comparison circuitry 82 comes from within the pipelined processor itself and corresponds to signals representing which general purpose registers are to be stored into by instructions already in the pipeline. If an instruction already in the pipeline will be storing into the same general purpose register indicated by the X field and contained on data bus 80, compare circuit 82 will have an output which is presented to AND circuit 86. Decoder 72 also will have an output which is presented to AND circuit 86 and this output will be active whenever an instruction resides in I Register 58 is of the proper type to have an X field. The output of AND circuit 86 will set program A GPR latch 88. The setting of program A GPR latch 88 means that one of the general purpose registers for the instruction of instruction stream A currently residing in I Register 58 will be changed by an instruction already in process within the pipeline. This means that the instruction within I Register 58 should be defeated and not allowed to be processed until such time as the general purpose register interlock has been resolved. This defeating of the instruction currently within I Register 58 is accomplished because program A GPR latch 88 has an output which is connected to OR circuit 90. The output of OR circuit 90 will be zero when any of the inputs are active which indicates that anyone of the latches connected to the input of OR circuit 90 has been set. A zero output from OR circuit 90 will indicate to the machine to defeat the instruction currently residing in I Register 58 and not allow that instruction to be gated into the Q registers.

Returning for a moment to the program A SS latch 70, it should be noted that this latch will be set whenever an SS instruction, an execute instruction or a store multiple instruction has been entered into I Register 58. However, program A SS latch 70 is not set until the instruction cycle complete clock occurs which will allow the instruction currently residing in the instruction register 58 to be processed but will prevent the processing of any future instructions in instruction stream A until a reset signal is set to program A SS latch 70. The instruction complete program A signal which resets program A SS latch 70 is a signal generated by the pipeline processor upon the completion of the instruction which caused program A SS latch 70 to be set. Note also that the setting of program A SS latch 70 causes an output to be placed to the input of OR circuit 90 which will cause OR circuit 90 to have a zero output. It will be recalled that a zero output for OR circuit 90 will prevent, as will be seen later, further processing of instructions in program A.

A second GPR interlock relates to instructions in which a B field is involved. Decoder 74 will have an output which is active and applied to AND circuit 98 whenever the operational code of the instruction from program A residing in instruction register 58 is of the type which should have a B field defined. The B field from the instruction in instruction register 58 is transmitted along data bus 92 to compare circuit 94. The address of the general purpose registers which will be changed by instructions already in the pipeline processor are transmitted along data bus 84 to compare circuit 94. Whenever compare circuit 94 has an output which is placed on line 96, the output indicates the presence of an instruction in the pipeline which will change the register defined by the address in the B field. This condition means that the present instruction in I Register 58 should be defeated. As a consequence, the signal on line 96 is applied to AND circuit 98, the output of which will set program A GPR latch 88. The setting of this latch, as has already been discussed, will defeat the processing of the instruction in I Register 58 until such time as program A GPR latch 88 is reset. This latch is reset by a signal indicating that there has been a general purpose register write for program A.

As was discussed earlier, another condition which should not be allowed to exist is that of having two branches being performed within the pipeline at the same time. Decoder 76 will have an active output whenever the instruction code in the instruction from program A residing in instruction register 58 is a branch instruction. This will set branch decoded latch 100. The output of branch decoded latch 100 is applied to AND circuit 102. The second input to AND circuit 102 is a clock signal corresponding to the instruction cycle complete clock which is shown in FIG. 6. AND circuit 102 will have an output at the end of the execution of the instruction cycle for the instruction within instruction register 58 and this will set the branch in progress latch 104. The output of branch in progress latch 104 is applied to AND circuit 106. AND circuit 106 will become active during the next gate instruction clock which is formed by ORing the signals on lines 52 and 54. AND circuit 106 will, therefore, reset branch decoded latch 100.

When the next branch instruction is decoded by decoder 76, assuming that the preceding branch has not been completed, branch decoded latch 100 will again be set. The output of branch decoded latch 100 is applied to AND circuit 108 as is the output of branch in progress latch 104. At clock A time, AND circuit 108 will have an output which is active and will set the second branch latch 110. The second branch latch 110 will only be set when two branches are being attempted to be processed at the same time within the pipeline processor, a condition which is not allowable. Therefore, the setting of the second branch latch 110 will cause the output of OR circuit 90 to be zero and this will in turn cause the instruction in I Register 58 to be defeated. Further instructions from program A will be prevented from being executed until such time as the branch instruction within the pipeline has been completed and a branch complete signal transmitted along line 112. The branch complete signal is a gated signal and has a timing relationship to the other clock signals as shown in FIG. 6. The branch complete signal will reset branch decode latch 100, branch in progress latch 104 and a second branch latch 110.

The aforementioned circuit within FIG. 3 is designed to handle three specific types of interlocks for a specific type of pipeline processor. There are other possible interlocks which could be shown, however, the necessity of describing these interlocks is questionable as they would relate to the specific pipeline processor. The importance of those already shown is clear and for a specific pipeline processor, and other interlock which should prevent processing of instructions within a given program should also be included. The detection of these interlocks should form inputs to OR circuit 90 if they pertain to program A. For the specific embodiment of the present invention, there are several specific inputs to OR circuit 90 which have not been shown which could easily be designed by those of skill in the art. For example, if the Q registers (found in FIG. 2) are full and cannot accommodate another instruction from program A, this instruction could block other processing of instructions from program A. Therefore, a Q register full indication from program A would also form an input to OR circuit 90. Another condition which could prevent processing of instructions from the instruction buffer for program A is the condition which indicates that the instruction buffer does not contain any instruction for program A. This condition also should be an input to OR circuit 90. One further condition that should form an input to OR circuit 90 is the condition that an instruction in the pipeline has made a main memory access. This condition will require that the instruction which has made the main memory access to be delayed until such time as the operand being fetched are made available. Thus, further instructions within the same program should be delayed because they cannot be processed since instructions are processed in order and an earlier instruction is waiting for data.

While the discussion heretofor concerning the circuitry of FIG. 3 has been related to instructions from program A, OR circuit 114 is shown in FIG. 3 and is the counterpart of OR circuit 90 for program B. A similar set of hardware to that shown specifically for program A in FIG. 3 must also be present to form the inputs to OR circuit 114 and perform the same functions upon instructions in I Register 58 for program B. This hardware would be essentially identical to that shown for program A within FIG. 3 with the exception that the gating function of line 60 as shown in FIG. 3 must be performed by taking the inverse of the signal on line 60 for the circuitry designed to handle the interlock problems for program B.

It will be recalled that the signals labeled $P_A$ and $P_B$ form signals which block the processing of instructions from program A or program B respectively, whenever these signals have a binary value of zero. These signals are also used in determining which instruction should be gated next from the instruction buffers to the I Register 58.

The circuitry which determines the instruction to be gated next to the I Register is shown in FIG. 4. The first input shown in FIG. 4 is the status of the I register latch which is transmitted on line 116. This is a signal which is received from flip-flop 68 found within FIG. 3 and a binary one value on line 116 indicates that an instruction from program A was last gated into the I Register. This signal forms an input to AND circuits 124 and 132.

Referring briefly to FIG. 5, a table is shown which states the various conditions which are required to determine which instruction buffer will be gated into the I Register during the next gating cycle. For example, in the first row of the table shown in FIG. 5, if the instruction currently residing in the I Register is from program A and each of the signals $P_A$ and $P_B$ have a binary one value, the instruction from program B should be selected next. The remainder of the table shows the instructions which will be selected next under varying machine status and instructions currently residing within the I Register. This is the truth table for the circuitry shown in FIG. 4. It should also be noted that the conditions on the left side of line one correspond to the input conditions to AND circuit 124 of FIG. 4. The conditions on the left side of the second line of FIG. 5 correspond to the input conditions of AND circuit 126 of FIG. 5. The sequential rows in FIG. 5 correspond to the inputs to AND circuits 128, 130, 132 and 134 of FIG. 4.

Referring again to FIG. 4, OR circuit 136 is activated by AND circuits 126, 130 or 132. Each of these AND circuits (126, 130, 132) will have an active output whenever the next instruction should be gated from program A as indicated by the conditions shown in FIG. 5. Likewise, OR circuit 138 is activated by AND circuits 124, 128 and 134 which in turn are active whenever the proper conditions as shown in FIG. 5 indicate that the next instruction should be gated from program B.

The output of OR circuit 136 is connected to AND circuit 140. Since the input conditions to OR circuit 136 are unique, the second input to AND circuit 140 is the gate instruction signal which is shown in FIG. 6 which is also shared as an input with AND circuit 142. The output of AND circuit 140 generates a signal entitled "Gate Instruction From Program A to I Register" which becomes an input to FIG. 3 and is applied to line 52. The output of AND circuit 142 is only active when any input to OR circuit 138 is active and the gate instruction signal is on. The output to AND circuit 142 is entitled "Gate Instruction From Program B to I Register" and forms an input to FIG. 3 which is placed upon line 54.

At the same time as the aforementioned interlock tests are being performed upon the instruction with the I register, other functions are being performed by the pipeline processor upon the instruction within the I Register.

In each stage of the pipeline various checks are made on the instruction and associated control triggers to determine if the instruction can advance to the next level. Certain control functions are associated with the levels or stages of the pipeline. An example of this is accessing of the General Purpose Registers. If an instruction requires accessing of the GPR's for address calculation this must be done while the instruction is in the I Register.

These functions relate to the setting up of various registers and conditions within the pipeline processor so that the instruction, upon reaching the execution register, will be in condition for execution. The functions performed upon the instruction within the I Register, however, are defeatable if the signals $P_A$ and $P_B$ for the appropriate instruction in the I register has a binary value of zero.

While the instruction is residing in I Register 58 (FIG. 3) a certain amount of processing of the instruction will occur simultaneous to the interlock checking. The necessary information from I Register 58 is transmitted over data bus 61 to the processor resources. The processor resources will respond to the data received from I Register 58 and start the necessary address calculation based upon the required general purpose registers indicated by the instruction. In addition, general purpose registers that need to be read and used by the instruction residing in the I Register 58 will be read while the instruction resides in I Register 58. In other words, the first rudiments of processing the instruction contained within I Register 58 are made and are based upon the assumption that there will be no interlock checks. Should an interlock check occur, however, the address calculations will be discarded and the contents read from the general purpose register will be ignored by the processor upon receipt of a machine status of zero from either OR circuit 90 or OR circuit 114.

When no interlock checks occur, the initial activities in calculating addresses and fetching general purpose registers have been done and will be saved by the processor for use in the actual processing of the data as required by the instruction designation contained within the operation code. During the next instruction gating period, the instruction residing in I Register 58 will be transmitted along data bus 59 to the Q Registers 58 along data bus 56. The latter instruction will have been selected in accordance with the gating algorithm defined in FIG. 5.

While the invention has been particularly shown and described with reference to the preferred embodiment thereof, it will be understood by those of skill in the art that the foregoing may be easily changed both in form and detail without departing from the spirit and scope of the invention.

What is claimed is:

1. In a pipelined processor an apparatus for controlling the processing sequence of two independent instruction streams comprising:
gating means including;
a logic circuit for transferring instructions from each of said instruction streams to a register connected to said gating means, depending on the instruction stream from which the preceding instruction was selected, the instruction currently residing in said register, and a control signal,
interlock checking means connected to said register for determining the capability of said pipelined processor to perform instruction in said register,
memory means connected to said gating means and interlock checking means for determining the instruction stream from which the instruction in said register was obtained,
control signal generator means responsive to said interlocking means and said memory means for generating the control signal input for said gating means.

2. The apparatus of claim 1 wherein said register is connected to said processor allowing the instruction to be processed simultaneously with the interlock check and to disregard the processing of the interlock check determines that this instruction will not be performed.

3. An apparatus for sharing a pipelined processor among instructions from two independent instruction streams comprising:
an independent source of instruction means for each of two independent instruction streams;
a gating means connected to each of said independent source of instruction means said gating means having an output and a control signal input to the gate, said gating means operational to gate the data from only one independent source of instruction means to said output of said gating means in response to said control signal input;
a register means connected to said gating means for receiving and storing an instruction gated by said gating means;
an interlock check means connected to said register means for determining if the instruction in said register means can be processed by the pipelined processor;
a memory means connected to said interlock check means for determining from which instruction stream present instruction was obtained;
a control signal generator means responsive to said interlock check means and said memory means for generating the next control signal input for said gating means.

4. The apparatus of claim 3 wherein said processor contains means to allow the instruction to be processed simultaneously with the interlock check generator.

5. A method of sharing a pipelined data processor between two independent instruction streams comprising the steps of:
1. Selecting an instruction from one instruction stream
2. Performing interlock checks upon the selected instruction to determine whether it may be performed
3. Performing the selected instruction while making interlock checks
4. Defeating the performance of the selected instruction if an interlock check is detected
5. Preventing further selection of instructions from the instruction stream having an interlock check until the interlock check is no longer present
6. Alternating selection of instructions from instruction streams when no interlock checks are detected.

* * * * *